United States Patent [19]

Jarman

[11] 4,456,116
[45] * Jun. 26, 1984

[54] SHEAR FRONT FEED SYSTEM

[76] Inventor: David J. Jarman, Box 181, RR 3, Aurora, Ind. 47001

[*] Notice: The portion of the term of this patent subsequent to Jan. 17, 1995 has been disclaimed.

[21] Appl. No.: 393,060

[22] Filed: Jun. 28, 1982

Related U.S. Application Data

[63] Continuation-in-part of Ser. No. 122,249, Feb. 19, 1980, abandoned, which is a continuation-in-part of Ser. No. 844,736, Oct. 25, 1977, abandoned.

[51] Int. Cl.³ .................. B65H 11/02; B65H 9/00
[52] U.S. Cl. ........................ 198/414; 198/456; 271/248; 271/251; 193/35 MD; 414/677; 83/418; 83/732
[58] Field of Search ............... 198/456, 782, 786, 361, 198/372, 414; 271/250, 251, 248, 236, 240, 238, 184, 225; 193/35 MD, 35 SS, 35 C, 36; 414/677, 531; 83/732, 418, 421

[56] References Cited

U.S. PATENT DOCUMENTS

| | | | |
|---|---|---|---|
| 2,566,417 | 9/1951 | Holm | 198/361 X |
| 2,848,095 | 8/1958 | Dolle | 193/35 MD X |
| 3,044,216 | 7/1962 | Billinger | 225/96.5 |
| 3,247,949 | 4/1966 | McDougall | 83/418 X |
| 3,295,660 | 1/1967 | Nelson | 198/414 |
| 3,670,864 | 6/1972 | Grandmontagne | 198/782 |
| 4,036,345 | 7/1977 | Webb | 193/35 MD X |
| 4,068,753 | 1/1978 | Jarman | 193/35 MD X |

Primary Examiner—Douglas C. Butler
Assistant Examiner—James E. Barlow
Attorney, Agent, or Firm—Irwin C. Alter

[57] ABSTRACT

A front feed system that includes powered rollers for feeding sheet metal into the front of a shear. In one embodiment, the system uses ball transfer apparatus for facilitating feeding the sheet metal at various angles to the shear blade as desired by the operator. The transfer apparatus may then be lowered to rest the oriented sheet metal on the rollers for delivery to the shear. In a second embodiment, a turntable is positioned proximate the shear to further facilitate final orientation of the sheet material to be sheared. In a third embodiment, the sheet metal is automatically forced against a squaring arm on the shear to assure cuts perpendicular to the edge of the sheet metal, whether the sheet is positioned on the ball transfer apparatus or on the rollers through inclination of portions of the conveyor and/or the ball transfer apparatus.

5 Claims, 7 Drawing Figures

SHEAR FRONT FEED SYSTEM

This application is a continuation-in-part of application Ser. No. 122,249 filed Feb. 19, 1980, now abandoned, which is in turn a continuation-in-part of application Ser. No. 844,736 filed Oct. 25, 1977, now abandoned.

BACKGROUND OF THE INVENTION

This invention is concerned with auxiliary shear equipment. More particularly, this application is concerned with front feed equipment for facilitating the feeding of sheet metal into the front of the shear at various angles for shearing action thereon.

Recently, automatic equipment has been provided to feed the sheet metal into the shear; however, this automatic equipment lacks versatility, in that it does not provide for manipulation of the sheet metal to obtain angular cuts as may be desired. For example, if it is desired to cut off corners, or cut the sheet metal at angles, the operator of the shear presently has to physically manually shift the sheet metal. This usually requires calling for assistance of another operator. Besides being wasteful of manpower, it also creates unsafe conditions; i.e., having more than one operator at a time utilizing the shear equipment.

Prior art conveyor systems include, among others:

R. F. Holm, U.S. Pat. No. 2,566,417 issued on Sept. 4, 1951;

D. E. Dolle, U.S. Pat. No. 2,848,095 issued on Aug. 19, 1958;

W. F. Billinger, U.S. Pat. No. 3,044,216 issued on July 17, 1962;

H. H. McDougal, U.S. Pat. No. 3,247,949 issued on Apr. 26, 1966;

J. E. R Webb, U.S. Pat. No. 4,036,345 issued on July 19, 1977; and

D. J. Jarman, U.S. Pat. No. 4,068,753 issued on Jan. 17, 1978.

The present improved shear front feed system has the capability of automatically forcing the sheet metal towards a squaring arm to automatically square up and true the sheet metal being operated upon by the shears.

In the past, the operator of the shear had to take extra precautions to be sure that the sheet metal was abutting the squaring arm of the shear. Under the pressure of production oftentimes cuts were made which were not square or not at the proper angle because of failure of the operator to abut the sheet metal against the squaring arm.

The present invention has the following objects:

To provide improvements over the presently available front feed systems for shears;

To provide front feed systems that automatically square the sheet metal on the system with relation to the shear blade;

To provide means for automatically squaring the sheet metal, while at the same time enabling override of the automatic squaring feature;

To provide removable means for automatically squaring the sheet metal on the front feed system;

To provide fixed means for automatically squaring the sheet metal on the front feed system relative to the blade;

To provide means for enabling the facile manipulation of sheet material proximate the shear to enable shearing of the material at any desired angle;

To provide means to deliver sheet material in a selected orientation to the shear; and To provide such apparatus in forms which are easy to manipulate and control.

SUMMARY OF THE INVENTION

In accordance with a preferred embodiment of the invention, a front feed system comprises powered rollers for moving the sheet material longitudinally into the cutting area. Certain selected ones of the rollers in one preferred embodiment are slanted to one side of the system to force the sheet material toward that side. The side towards which the sheet material is forced is the side of the shear squaring arm. Ball transfer means are also provided which can be elevated or lowered in accordance with the necessity of utilization.

In another embodiment, all the rollers are parallel and not slanted towards either side. However, the ball transfer means are slanted towards the squaring arm side of the front feed system, whereby when the ball transfer means are elevated for operation, they automatically enable the sheet material to slide into abutment with the squaring arm of the shear.

In yet another embodiment of the invention, the feed system comprises powered rollers having certain selected ones of the rollers biased to force the sheet material against the squaring arm. In addition, the movable ball transfer means is also biased to force the sheet material against the squaring arm.

In yet another embodiment of the invention, a turntable is positioned on the feed mechanism such that sheet material upon the turntable may be rotated to a desired angle when the turntable is elevated, and may be thereafter maintained in said orientation on the powered rollers when said turntable is lowered.

BRIEF DESCRIPTION OF THE DRAWINGS

The above mentioned and other objects and features of the invention together with the manner of obtaining them will be best understood by making reference to the following specification in conjunction with the accompanying drawings, wherein.

DETAILED DESCRIPTION OF THE DRAWINGS

Figure 1:
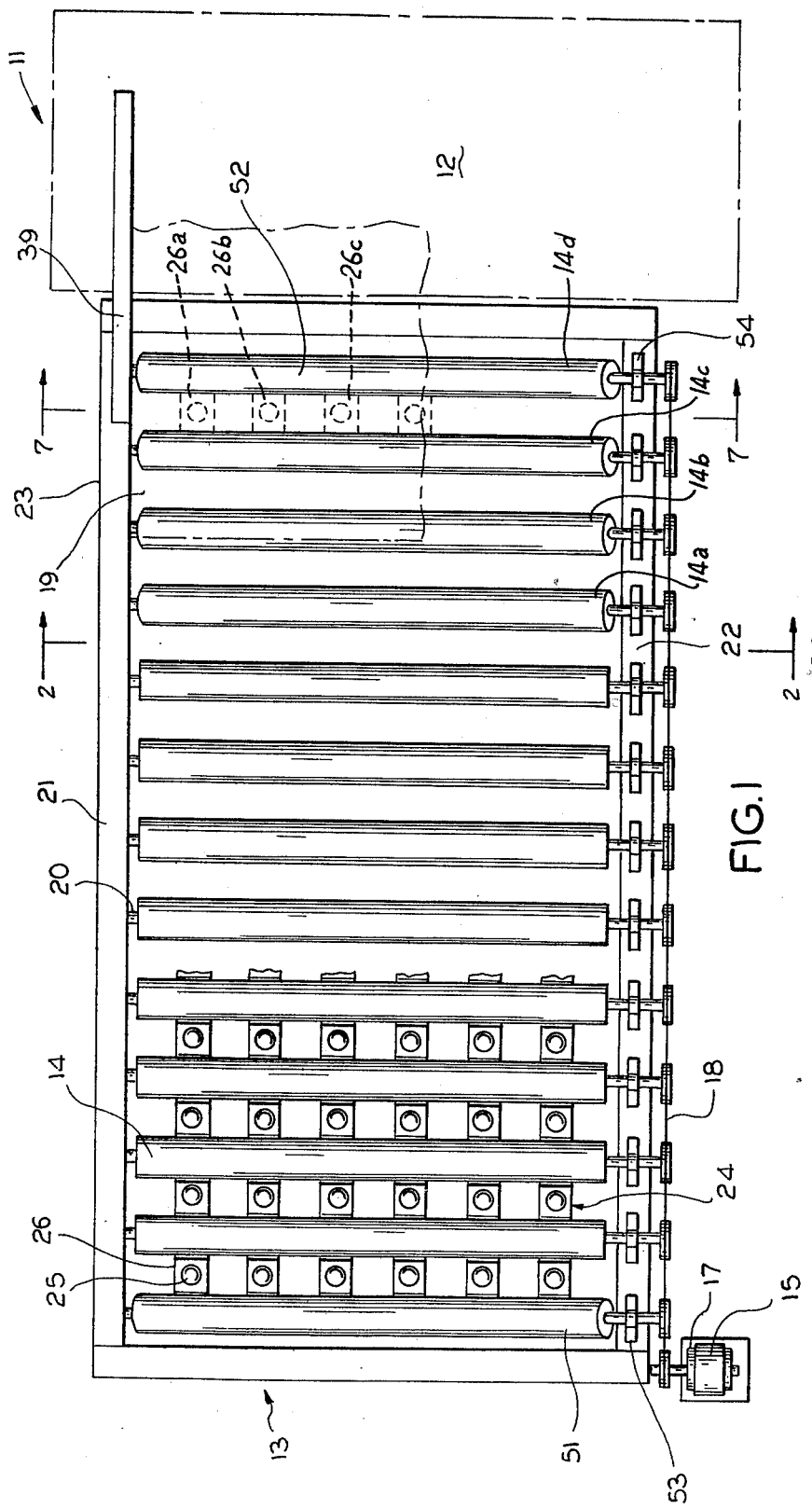
FIG. 1 is a plan view of the improved front feed conveyor.
Figure 2:
FIG. 2 is a partial sectional view of a biased roller of the conveyor shown in FIG. 1.

The entire system may generally be designated by reference to FIG. 1. The numeral 11 represents generally a shear front feed system. The shear equipment which is fed by the system is generally shown by the broken line block 12. The conveyor means for feeding the sheet metal into the cutting area of the shear equipment 12 is shown as powered roller table 13. The powered rollers, such as roller 14, for example, are driven by a motor 15 generally depicted operating through the schematically shown reducer 17. Each of the powered rollers is attached to the gear reducer through a power transmission means, such as chain 18, schematically shown.

The powered rollers normally are turned selectively either in a clockwise direction or counter-clockwise direction to drive the sheet material, such as that shown at FIG. 1 as broken line drawing item 19, toward the shear equipment 12 or away from the shear equipment 12. The rollers are preferably rubber or plastic lined to minimize marring of the sheet material.

The rollers rotate around axles, shown for example as axle 20, which preferably are mounted in bearing blocks attached to parallel spaced apart rails 21 and 22. Each of the rails normally has a protective sheet metal cover, such as for example sheet metal cover 23 on rail 21. However, rail 22 and its associated axle mounting equipment are shown without the protective cover to better describe the invention.

Means are provided for enabling the operator of the system to move the sheet material transverse to the longitudinal direction otherwise followed by the material responsive to the movement of the powered rollers, or in a diagonal direction relative to the shear equipment. These means are the ball transfer means, generally shown at 24 in FIG. 1.

The transfer ball means includes spheroids, such as spheroid 25, mounted in bearing blocks, such as bearing block 26. Preferably, the bearing blocks are mounted in rows between each of the rollers to thereby fully and firmly support even the thinnest gauge material being processed in the shearing equipment.

Figure 3:
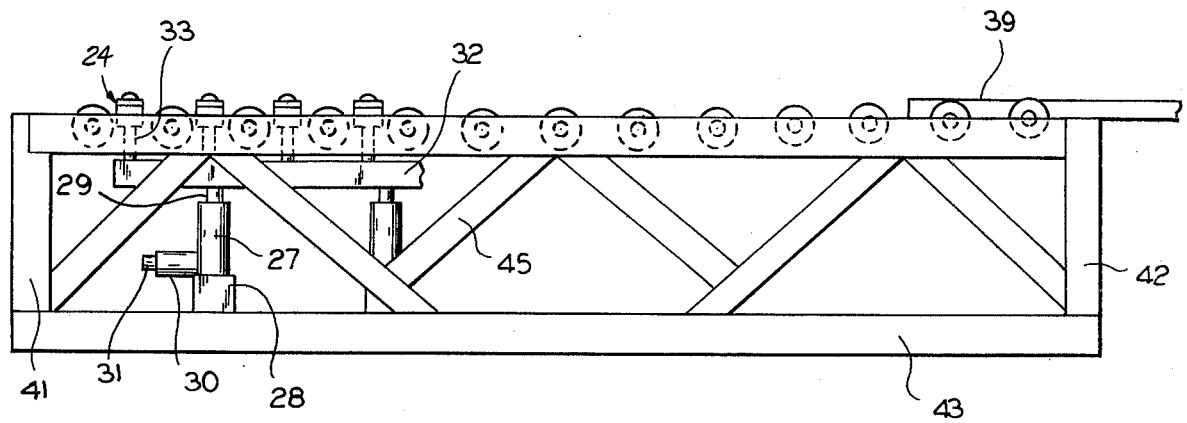
FIG. 3 is a side view of the improved shear front feed system.
Figure 6:
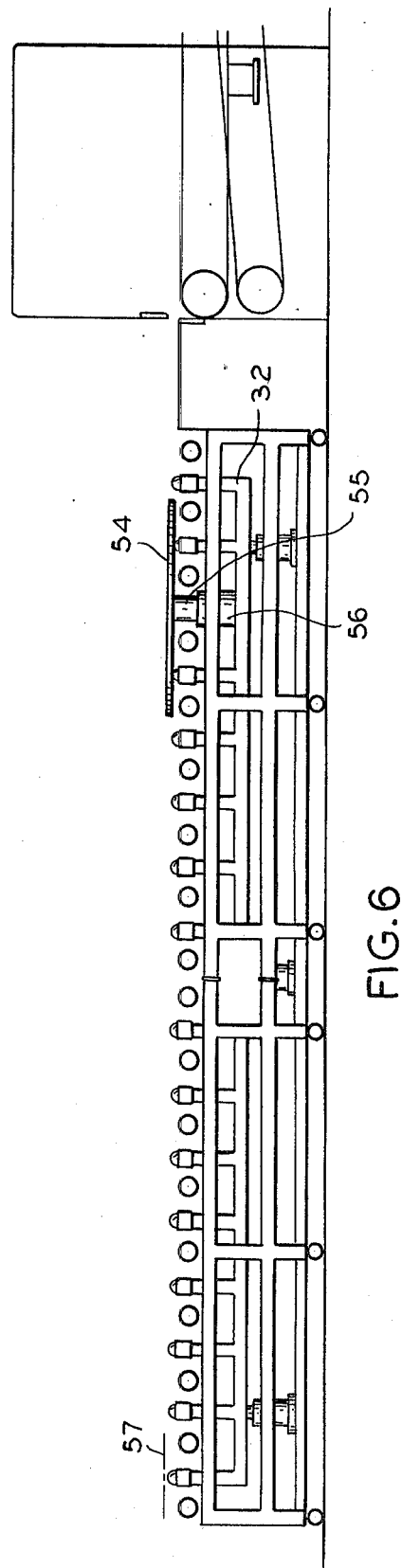
FIG. 6 is a side view of the embodiment pictured in FIG. 5.

As shown in FIG. 3 and FIG. 6, means are provided for elevating or lowering the transfer ball means 24 as desired. This means is shown as fluid operated cylinders, such as cylinder 27. The cylinders are shown mounted on bases, such as block 28 and have a piston, such as piston 29, extending from the cylinder. A control valve, such as valve 30, preferably electrically operated by solenoid 31, is shown mounted to the cylinder 27. A plurality of pistons may be controlled to operate in unison and are coupled to a frame means for supporting the transfer balls, such as longitudinally extending frame member 32. Preferably, frame member 32 is a hollow tube-like beam extending the full length of the transfer balls 24.

It should be understood that preferably there are a pair of such hollow beams—one on each side of the conveyor equipment—and preferably there are pairs of cylinders mounted on the opposite sides of the conveyor under the longitudinally extending hollow beam members. Transverse members, such as member 33, rest on the hollow beams, such as beam 34 of FIG. 4, which in turn are coupled to oppositely disposed longitudinal parallel members, such as member 32. Preferably, member 33 is an I-beam having flanges 36 and 37 and a web section 38.

Should square cuts be required, means are provided for automatically forcing the sheet material against the squaring arm 39 of the shear 12. Naturally, transfer balls are effective for effecting the movement of the sheet material only when transfer balls are in the upraised position. The means for automatically forcing the sheet material against the squaring arm are actually two separate means—one operated when the sheet material is on powered rollers 14 and the other operated when the sheet material is on the transfer balls 24.

If it is desired that the sheet material be moved to abut the squaring arm at only selected times, then only the transfer ball abutting means may be provided. If it is desired that the sheet material be driven to abut the squaring arm when the transfer balls 24 are in the lower position, then only the powered roller abutting means will be provided. If it is desired that the sheet material always abut the squaring arm, then both means may be provided.

The transverse members, such as members 21 and 22, are shown as supported by pillar-like standards 41 and 42. The pillar-like standards are shown as set on a base, such as base means 43. Longitudinal members 21 and 22 are also supported by diagonal frame members, such as diagonal frame member 45.

The transfer balls comprise a pad, such as pad 44, which holds the actual transfer balls, such as ball transfer spheroid 46, mounted on bearing block 47. These transfer balls are then mounted on the I-beam 33 which in turn is mounted on the transverse hollow member 34. The transfer ball members juxtaposed to the squaring arm are equipped to force the sheet material towards the squaring arm 39.

Figure 4:
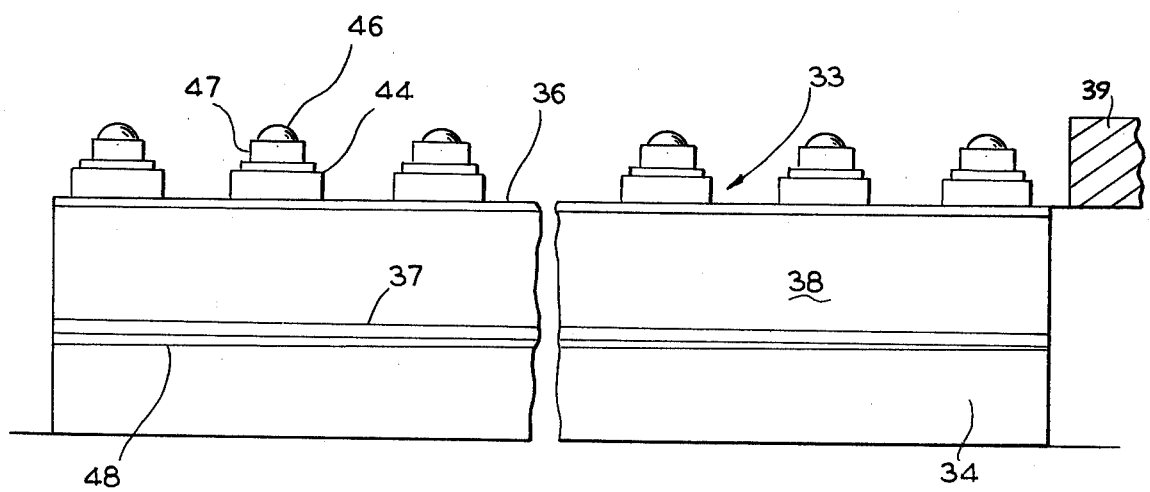
FIG. 4 is a front view of a ball transfer row showing the biasing improvement of the front feed ball transfer system for introducing sheet metal that is to be sheared into the cutting area of the shear.

This is accomplished, as best seen in FIG. 4, by biasing the transfer balls towards the squaring arm. More particularly, a wedge 48 is placed between transverse member 34 and I-beam 33.

In a particular embodiment of the invention the wedge-shaped spacer 48 had a maximum height of $\frac{1}{2}$ inch and was used on an I-beam that was 83 inches in length. The wedge terminated prior to the squaring arm end of the I-beam 33 and cross member 34 so that there was a maximum of $\frac{1}{2}$ inch rise for the 83 inches of length. This has been found sufficient to force the sheet material to abut the squaring arm.

Figure 7:
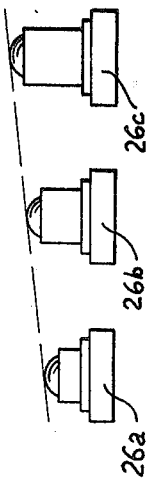
FIG. 7 is a partial cross-sectional view showing the inclination of the ball transfer means towards the squaring arm taken along line 7—7 of FIG. 1 and in the direction of the arrows.

Alternatively, as shown in FIG. 7, biasing of the sheet metal towards the squaring arm 39 is achieved by arranging the ball transfer means 26a, 26b, and 26c in order of descending height as one approaches the squaring arm 39. Though only a portion of one row of ball transfer means, 26a, 26b, and 26c is shown in FIG. 1 and FIG. 7, it should be understood that the last few rows of ball transfer means are likewise inclined.

Similarly, in a preferred embodiment, one or more of the powered rollers 14 are canted toward the squaring arm, as can be seen from FIG. 1, and in particular can be seen at the last four rollers 14a, 14b, 14c and 14d of the powered roller series. Typical means of accomplishing the biasing of the rollers is by placing a pad under the bearing blocks on one side of the conveyor providing a cant on the rollers of approximately $\frac{1}{2}$ inch per 10 feet. It was found that this was sufficient to force sheet material being moved by the powered rollers to abut the squaring arm.

In operation, a piece of sheet material, such as sheet material 19, is placed on the powered rollers. The canted powered roller 14a starts the sheet metal moving towards the squaring arm side of the conveyor. The remaining rollers 14b, 14c and 14d are also canted and also force the sheet material towards the squaring arm as shown in FIG. 1, the pitch or inclination of rollers 14a, 14b, 14c and 14d increases gradually as one approaches the shear so as to provide for smooth passage of the sheet metal over the rollers 14 as the sheet metal is biased towards the squaring arm. Thus, the sheet material approaches the shear in a squared or perpendicular condition. Similarly, the last few rows of the transfer balls 24 are canted to force the sheet metal towards the squaring arm. Hence, through inclination of the rollers 14 and/or ball transfer means 24, gravity biases the sheet metal against the squaring arm 39.

Figure 5:
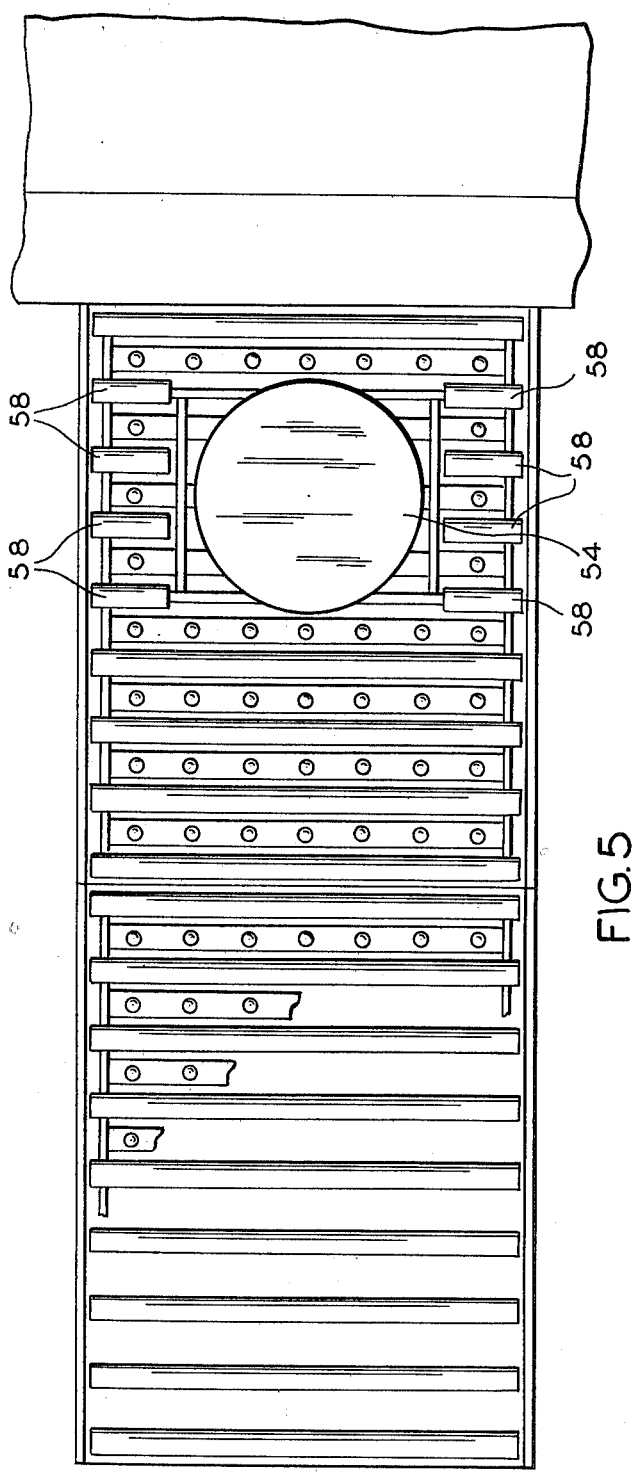
FIG. 5 is a plan view of an improved front feed conveyor incorporating a turntable.

Yet another preferred embodiment, generally depicted in FIGS. 5 and 6, provides an adjunct means for angling sheet material to be sheared at an angle other than ninety degrees to the shear.

Turntable 54 is rotatably mounted upon shaft 55 attached to base 56. In a preferred arrangement, base 56 is mounted to frame member 32 and base 56 includes a hydraulic cylinder—not herein specifically shown—utilizable to raise or lower turntable 54 with respect to the level of transfer balls 24. Thus, the elevation of turntable 54, above or beneath powered rollers 14 may be the same as the level 57 of transfer balls 24, as shown in FIG. 6, or may be higher or lower, as desired.

Turntable 54 is rotatable through 360 degrees, thus providing a manner for positioning a piece of sheet stock at any desired angle prior to shearing.

To accommodate turntable 54, front feed system 11 may be modified by providing shortened rollers 58 as seen in FIG. 5. Shortened rollers 58 may be positioned on either side of turntable 54 to provide support for sheet metal 19 when transfer balls 24 and turntable 54 are lowered beneath the level of rollers 14 and 58.

It is contemplated that use of turntable 54 will enable more accurate placement of sheet metal 19 at a desired angle because turntable 54 rotates on a single axis perpendicular to the feed bed, while individual transfer balls 24 are free to rotate on virtually any axis. Once the sheet metal 19 has been positioned, and transfer balls 24 and turntable 54 move to the lowered position, powered rollers 14 and shortened rollers 58 may be utilized to move the sheet stock forward to the shear at the selected angle.

In the embodiment employing one or more biased powered rollers 14 proximate to the shear 12, turntable 54 may be aligned with transfer balls 24 at level 57, and thereafter both turntable 54 and transfer balls 24 may be elevated by subframe 32 to a level above said biased powered roller, making it possible for sheet metal 19 to be delivered to said shear at a selected angle without interference from powered roller 52. Where no powered rollers are biased, turntable 54 and transfer balls 24 may be consistently aligned at the same level and so used.

While the principles of the invention have been described above in connection with specific apparatus and applications it is to be understood that this description is made by way of example only and not as a limitation on the scope of the invention.

What is claimed is:

1. In a shear front feed system for feeding sheet metal into the front of a shear, said shear of the type having a squaring arm for aligning a lateral edge of sheet metal to be fed to the shear, and including a feed system having: conveyor means to convey said sheet metal to the front of said shear for shearing operations; said conveyor means including a sheet metal receiving end remote from said shear and a sheet metal transfer end adjacent said shear as well as a plurality of parallel, spaced apart, powered roller means for moving the sheet metal from said receiving end to said transferring end; ball transfer means free to rotate in any direction mounted on said conveyor means for facilitating the movement of the sheet metal from the direction actuated by the roller means to thereby present the sheet metal at a selected one of various angles to the blade of the shear; means for lifting said ball transfer means to a position above said powered roller means to separate said sheet metal from said roller means for reorientation of said metal upon said roller means, said feed system further comprising:
   squaring means for automatically conveying said sheet metal to abut said squaring arm; and
   said squaring means automatically inducing the convergence of said sheet metal at said squaring arm for said alignment through continuous gravitational exertion acting in a single direction.

2. The invention according to claim 1 wherein said squaring means includes means inclining at least one of said powered rollers towards said squaring arm so as to force said sheet metal against said squaring arm for perpendicular presentation of said sheet metal to said shear.

3. The invention according to claim 2 wherein there is a plurality of said inclined rollers that increase in pitch from said receiving end to said transfer end along said conveyor means to form an incline so as to gradually cause said sheet metal to abut said squaring arm.

4. The invention according to claim 1 wherein said squaring means includes tilting said ball transfer means by elevating said ball transfer means furthest from said squaring arm with respect to the ball transfer means most proximate to said squaring arm.

5. The apparatus as recited in claim 1 wherein said conveyor means further includes:
   a turntable situated proximate said sheet metal transfer end adjacent said shear;
   said turntable being fully rotatable about an axis perpendicular to said powered rollers for a substantial range of rotational movement;
   said turntable being elevatable with respect to said powered rollers and said ball transfer means, so as to separate said sheet metal from said conveyor means for reorientation of said sheet metal upon said roller means at any selected angle within said range of rotational movement of said turntable for angled presentation of said sheet metal to said shear;
   said turntable being lowerable with respect to said powered rollers and said ball transfer means after reorientation of said sheet metal so as to allow movement of said sheet metal along said rollers for presentation of said metal to said shear at said selected angle; and
   shortened powered rollers flanking said turntable so as to permit movement of said sheet metal past said turntable when said turntable is in said lowered position.

* * * * *